Dec. 24, 1957     E. W. CHRISTEN     2,817,512
WINDOW REGULATOR SAFETY DEVICE
Filed March 10. 1955     2 Sheets-Sheet 1

INVENTOR
Eugene W. Christen
BY Paul Fitzpatrick
ATTORNEY

Dec. 24, 1957   E. W. CHRISTEN   2,817,512
WINDOW REGULATOR SAFETY DEVICE
Filed March 10, 1955   2 Sheets-Sheet 2
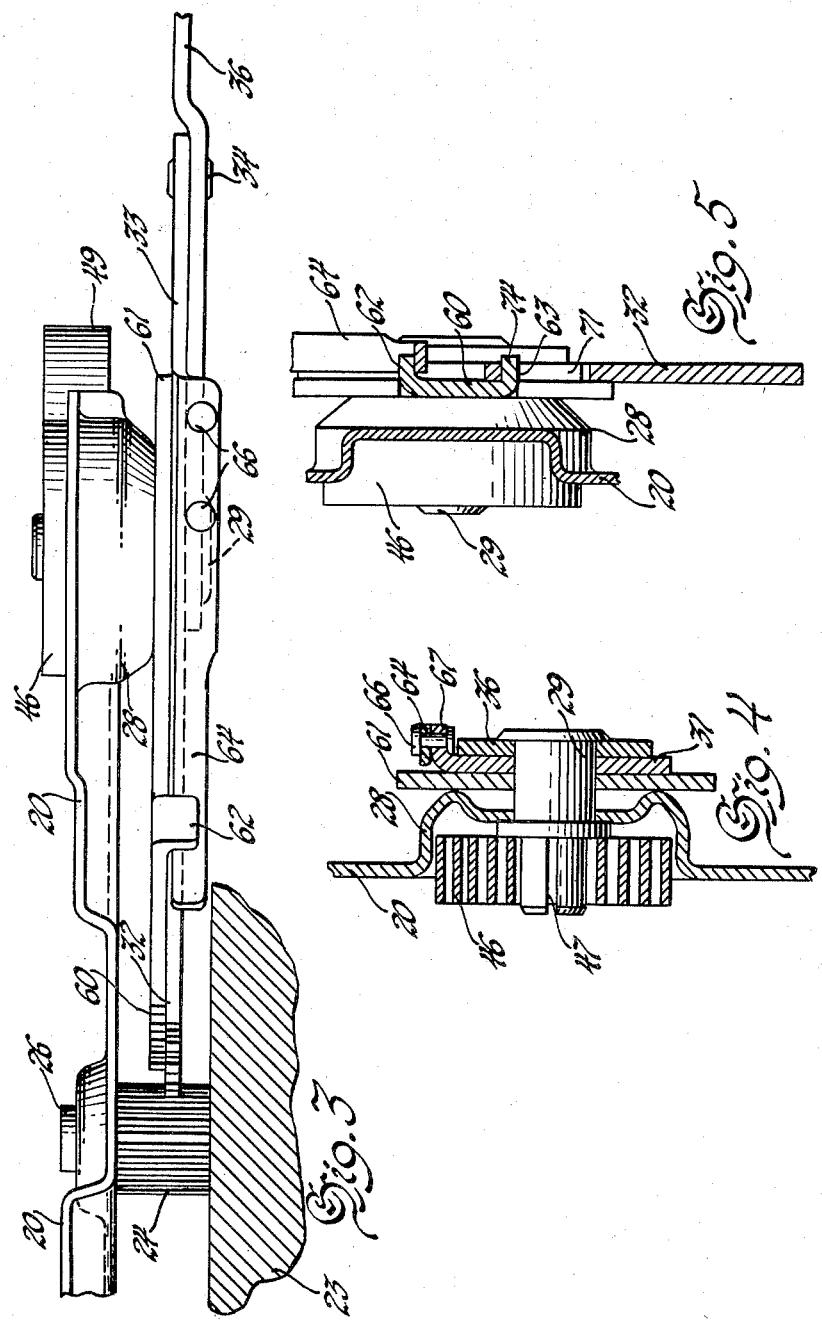
INVENTOR
Eugene W. Christen
BY
Paul Fitzpatrick
ATTORNEY

United States Patent Office 2,817,512
Patented Dec. 24, 1957

2,817,512

WINDOW REGULATOR SAFETY DEVICE

Eugene W. Christen, Birmingham, Mich., assignor to General Motors Corporation, Detroit, Mich., a corporation of Delaware Application March 10, 1955, Serial No. 493,509

8 Claims. (Cl. 268—124)

My invention relates to actuators, and particularly to a power actuator for automobile door windows and the like having special provisions for safety of persons who might be caught by the window when it is closed. By way of background to the problem solved by the invention, power actuators or regulators for automobile windows have been increasingly popular. These regulators are not only convenient, but may contribute substantially to the operating safety of the automobile by making it possible to adjust the windows without withdrawing the attention of the driver from the road.

Since such actuators deliver considerable force, there is a possibility of painful impingement of the hand or arm of a passenger in the event the driver should inadvertently operate the wrong control or operate it in the wrong direction. Also, there have been instances of injury to children who played with power window lifts. It has been suggested that the window be driven through a slip clutch, but this is unfeasible for various reasons. It makes it possible to push the window down from outside the car to obtain unauthorized entry. It may cause loss of control over a window frozen open or shut.

The present invention provides a power operator for windows or analogous purposes which drives positively through the rang from open position to near closed position and then provides a drive which is resilient, yielding, or force-limiting so that the force exerted by the window on any object in its path is suitably limited and may be materially reduced. The invention, however, preferably includes structure such that a positive drive is provided to move the window from the closed position so that it can be broken loose if frozen by the full power of the motor.

The principal objects of the invention are to improve the safety, comfort and convenience of automobiles; to provide a safety actuator for closures such as may inflict pain or injury; and to provide a simple power transmission in an actuator which is positive in one direction of travel and impositive in another.

The nature of the invention and the advantages thereof will be clearly apparent from the succeeding description of the preferred embodiment of the invention and the appended drawings thereof, in which:

Figure 3 is a partial plan view of the same;

Figure 4 is a transverse sectional view taken on the plane indicated in Figure 2; and Figure 5 is a transverse sectional view taken on the plane indicated in Figure 2.

The invention is shown and described herein as embodied in a previously known window regulator mechanism shown and claimed in U. S. patent application Serial No. 393,986 of Leslie, Schamel, and Semar for Window Regulators, filed November 24, 1953, of common ownership with this application. As will be apparent upon consideration of the invention, however, it may very readily be applied to other installations.

Figure 1:
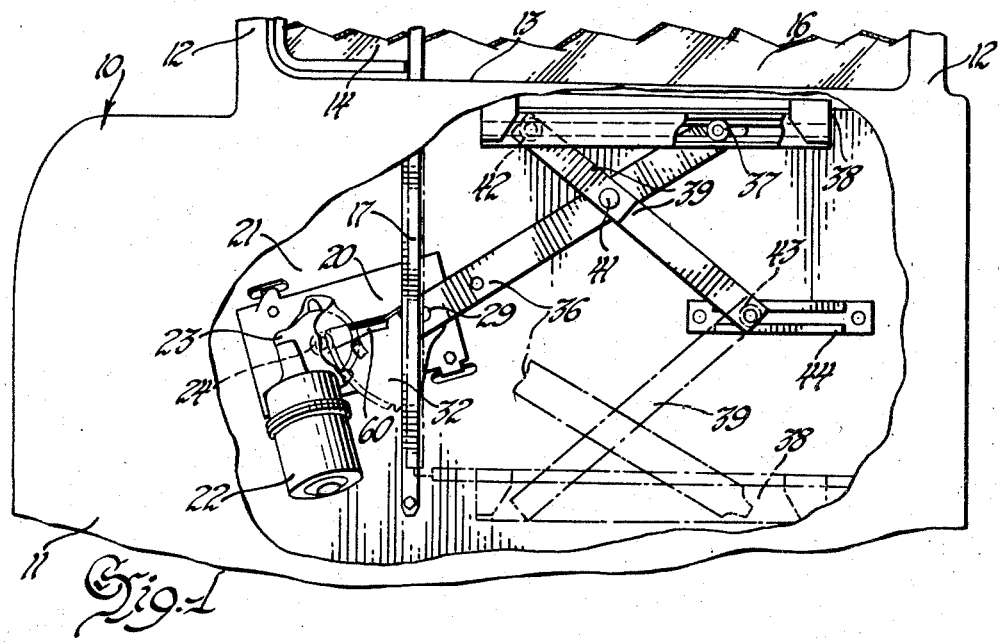
Figure 1 is a partial elevation view of an automobile door as viewed from the outside with the outer door panel cut away.
Figure 2:
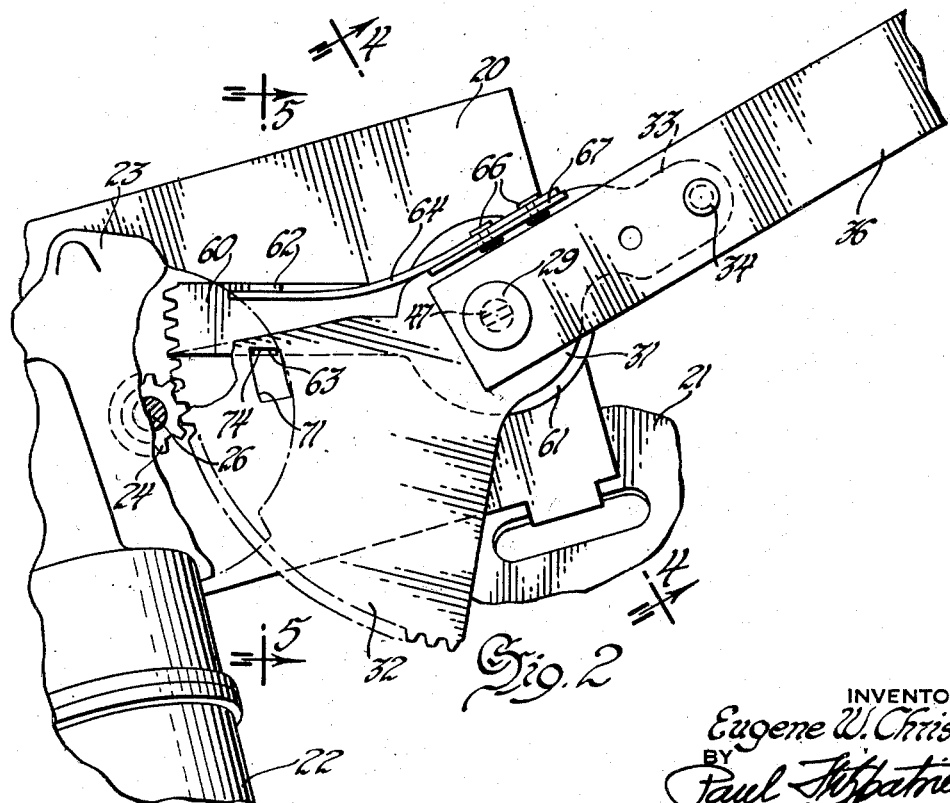
Figure 2 is an enlarged elevation view of a portion of the window actuator.

Referring first to the general nature of the regulator, this will be described only briefly, omitting details immaterial to an understanding of the present invention. Referring first to Figure 1, there is shown an automobile left front door 10 having an outer panel 11 which extends upward into posts 12 which define a window frame or opening 13, only the lower portion of which is illustrated. Within the window opening is mounted a pivoted controlled ventilation window 14 of known type and a vertically slidable window or closure 16.

The window 16 is movable from the closed position shown to an open position in which it is contained within the well between the door panels and below the window sill, as indicated in broken lines in Figure 1. The window may be guided in the usual glass run channel 17 at the front and a similar channel (not illustrated) at the rear. Movement of the window is effected by an actuator or regulator mechanism comprising a frame or support 20 suitably fixed to the inner door panel 21. A motor 22 and a worm and wheel reduction gear 23 comprise an assembly bolted to and spaced outwardly from the frame 20. A pinion 24 driven by the motor through the worm gearing extends from the inner face of the gear assembly 23, the shaft of the pinion being piloted in a boss 26 formed in the plate 20. An outwardly projecting boss 28 formed in the plate 20 is centrally pierced to support a flanged shaft 29 on which is mounted the hub portion 31 of a gear sector 32 meshing with pinion 24. An arm 33 extending from hub 31 is coupled by a rivet 34 to the lift arm 36 which is fixed to the shaft 29. As will be apparent, rotation of the sector 32 by pinion 24 rotates arm 36 about its pivot defined by shaft 29. The outer end of arm 36 mounts a roller 37 which may move longitudinally of the vehicle in a track 38 fixed to the lower edge of the window glass 16. A lever 39 comprising two arms connected by a shaft 41 is pivotally mounted by the shaft 41 on the lift arm 36. The upper end of lever 39 mounts a roller 42 slidable in the track assembly 38 and the lower end mounts a roller 43 guided in a horizontal track 44 fixed to the inner panel of the door. This crossed arm regulator linkage is well known, and is described more completely in the aforementioned prior application. It maintains the bottom edge of the window horizontal while leaving it free in a fore and aft direction so that it may follow the vertical guide tracks.

The weight of the window and regulator assembly is counterbalanced by a coil spring 46, the inner end of which is mounted in a slot 47 in the inner end of shaft 29 and the outer end of which is formed into a hook 49 which engages a lug (not illustrated) extending from frame 20.

In the device of which this invention is an improvement, the sector 32 meshes with pinion 24 through the entire range of movement of the window, thus providing a positive or rigid coupling between the pinion driven by the motor and the lift arm 36 so that, if anything is caught between the window and the top of the door frame as the window is raised, the full force of the motor is available to press it.

In the regulator of this invention, the upper end of the arc of the sector 32 is shortened so that the pinion 24 loses mesh with the sector when the window is still several inches (preferably about four inches) from its closed position. An auxiliary sector 60 of considerably shorter angular extent than sector 32 provides the coupling from pinion 34 to lift arm 36 during the uppermost part of the travel of the window. This sector 60 is integral with a hub 61 freely mounted on shaft 29 between hub 31 of sector 32 and boss 28.

Two tabs 62 and 63 are bent forwardly from the sector 60 into the plane of sector 32. Tab 62 engages a single leaf spring 64, the base of which is fixed by rivets 66 to an outwardly extending flange 67 on the hub 31 of sector 32. Tab 63 extends through an arcuate slot 71 in gear sector 32, the upper end of the slot defining an abutment 74 against which the tab 63 is normally engaged under the resilient bias of spring 64.

The teeth on the sectors 32 and 60 are so arranged that with the tab 63 engaging the abutment 74 at the upper end of the slot the teeth are continuous and the two sectors act effectively as a single gear sector. Thus, when the window is raised, pinion 24 runs over the composite sector gear from the lower end of sector 32 to the upper end of sector 60, raising the window in the normal manner. However, when the pinion runs off sector 32 onto the resiliently coupled sector 60, the force available to drive the window is determined by the yieldable leaf spring 64 which may be so calibrated that the force available is sufficient to raise the window under normal conditions but is not sufficient to inflict bodily harm or painfully grip a hand, for example, extending through the window. Even if the window is unusually stiff through some misadjustment so that it requires more force than the spring 64 will transmit, the window can be brought near the closed position by sector 32.

When the actuator is energized to lower the window pinion 24 first is coupled with gear 60; however, either initially or upon slight rotation of sector 60, the tab 63 engages abutment 74, providing a positive or rigid connection between the pinion and the arm 36 through sector 32. It will thus be seen that the actuator structure of the invention provides a positive drive in the downward direction so that the full power of the motor can be used to break loose a frozen or otherwise recalcitrant window. Also, any attempt to open the window by pushing down on the top of the window can only push it to a small extent sufficient for sector 32 to engage pinion 24 which is coupled to the motor through an irreversible worm gear so that the window cannot be further opened.

Thus, it will be seen that the actuator of the invention provides the significant advantages of a positive drive of the window with the added advantage of an impositive or limited-effort force transmission during the final stage of closing of the window during which casualties to persons are possible.

It will be apparent to those skilled in the art that the principles of the invention may be embodied in various mechanism and that many modifications of structure may be arrived at by the exercise of skill in the art without departing from the principles of the invention as disclosed herein.

I claim:

1. In combination, a body defining an opening, a closure movable to open and close the opening, a motor, and means coupling the motor to the closure for movement thereof, the last-named means comprising a first driving connection between the motor and the closure operative through the range of movement thereof between open position and an intermediate position and a second driving connection between the motor and the closure operable through the range of movement of the closure between the intermediate position and the closed position, the second driving connection comprising means in the connection yieldable in response to a predetermined force transmitted through the connection for limiting the closing force exerted by the motor on the closure.

2. In combination, a body defining an opening, a closure movable to open and close the opening, a motor, and means coupling the motor to the closure for movement thereof, the last-named means comprising a positive driving connection between the motor and the closure operative through the range of movement thereof between open position and an intermediate position and and impositive driving connection between the motor and the closure operable to limit the force exerted by the motor on the closure in the closure-closing direction operable through the range of movement of the closure between the intermediate position and the closed position.

3. In combination, a body defining an opening, a closure movable to open and close the opening, a motor, and means coupling the motor to the closure for movement thereof, the last-named means comprising a positive driving connection between the motor and the closure operative through the range of movement thereof between open position and an intermediate position and a driving connection between the motor and the closure yieldable in the closure-closing direction operable through the range of movement of the closure between the intermediate position and the closed position.

4. In combination, a body defining an opening, a closure movable to open and close the opening, a motor, and means coupling the motor to the closure for movement thereof, the last-named means comprising a positive driving connection between the motor and the closure operative through the range of movement thereof between open position and an intermediate position and a driving connection between the motor and the closure positive in the closure-opening direction and yieldable in the closure-closing direction operable through the range of movement of the closure between the intermediate position and the closed position.

5. A window regulator adapted to be installed in a vehicle body and to be coupled to a movable window in said vehicle body for actuation of the window between open and closed positions comprising, in combination, a fixed frame, an actuating device movably mounted on the frame and coupled to the window, a motor on the frame, a first means driven by the motor, a second means driven by the first means during travel of the window between open position and a partially closed position, the second means being positively coupled to the actuating device, a third means driven by the first means during travel of the window between the partially closed position and closed position, means positively coupling the third means to the device for movement of the window toward open position, and means resiliently coupling the third means to the device for movement of the window toward closed position.

6. A window regulator adapted to be installed in a vehicle body and to the coupled to a movable window in said vehicle body for actuation of the window between open and closed positions comprising, in combination, a fixed frame, an actuating device movably mounted on the frame and coupled to the window, a motor on the frame, reduction gear means comprising a first gear driven by the motor, a second gear driven by the first gear during travel of the window between open position and a partially closed position, the second gear being positively coupled to the actuating device, a third gear driven by the first gear during travel of the window between the partially closed position and closed position, means positively coupling the third gear to the device for movement of the window toward open position, and force-limiting means coupling the third gear to the device for movement of the window toward closed position.

7. A window regulator adapted to be installed in a vehicle body and to be coupled to a movable window in said vehicle body for actuation of the window between open and closed positions comprising, in combination, a fixed frame, an actuating arm rotatably mounted on the frame and adapted to be coupled to the window, a motor on the frame, reduction gear means comprising a first gear driven by the motor, a second gear driven by the first gear during travel of the window between open position and a partially closed position, the second gear being positively coupled to the actuating arm, a third gear driven by the first gear during travel of the window between the partially closed position and closed position, means positively coupling the third gear to the arm for movement of the window toward open position, and means resiliently coupling the third gear to the arm for movement of the window toward closed position.

8. A window regulator adapted to be installed in a vehicle body and to be coupled to a movable window in said vehicle body for actuation of the window between open and closed positions comprising, in combination, a fixed frame, an actuating arm rotatably mounted on the frame and adapted to be coupled to the window, a motor on the frame, reduction gear means comprising a first gear driven by the motor, a second gear driven by the first gear during travel of the window between open position and a partially closed position, the second gear being rigidly coupled to the actuating arm, a third gear driven by the first gear during travel of the window between the partially closed position and closed position, abutment means rigidly coupling the third gear to the arm for movement of the window toward open position, and spring means resiliently coupling the third gear to the arm for movement of the window toward closed position.

References Cited in the file of this patent
FOREIGN PATENTS 706,896  Great Britain _____ April 3, 1954

U. S. DEPARTMENT OF COMMERCE
PATENT OFFICE
CERTIFICATE OF CORRECTION

Patent No. 2,817,512                          December 24, 1957

Eugene W. Christen

It is hereby certified that error appears in the printed specification of the above numbered patent requiring correction and that the said Letters Patent should read as corrected below.

Column 1, line 39, for "rang" read -- range --; column 3, line 48, for "mechanism" read -- mechanisms --; line 74, for "and", first occurrence, read -- an --; column 4, line 44, for "the" read -- be --.

Signed and sealed this 4th day of March 1958.

(SEAL)

Attest:

KARL H. AXLINE                                        ROBERT C. WATSON

Attesting Officer                                    Commissioner of Patents